United States Patent
Shaw

[15] 3,662,799
[45] May 16, 1972

[54] NUT CRACKING APPARATUS

[72] Inventor: Paul W. Shaw, 2151 West Road, Whittier, Calif. 90603

[22] Filed: Apr. 20, 1970

[21] Appl. No.: 29,821

[52] U.S. Cl. ............................................................146/11
[51] Int. Cl. .........................................................A23n 5/04
[58] Field of Search ....................146/8, 10, 11, 32; 130/30 B

[56] References Cited

UNITED STATES PATENTS

| | | | |
|---|---|---|---|
| 2,155,793 | 4/1939 | Komaki | 130/30 B |
| 2,631,626 | 3/1953 | Snook et al. | 146/11 |

FOREIGN PATENTS OR APPLICATIONS

| | | | |
|---|---|---|---|
| 424,992 | 9/1947 | Italy | 146/11 |

*Primary Examiner*—Willie G. Abercrombie
*Attorney*—J. Carroll Baisch

[57] ABSTRACT

Apparatus for cracking nuts, without crushing the kernels thereof, having a fixed plate with a cutting blade and a rotatable wheel adjacent the plate and having radially arranged cutting blades cooperable with the blade of the plate, the side of the wheel adjacent the plate being in the shape of a shallow frustum, so that the space between the plate and the wheel comprises an operating compartment or chamber. The nuts are fed to the chamber one at a time and, at the bottom of this chamber, the nuts are cracked between the blade of the plate and one of the blades of the wheel. The nuts are cut and twisted by the blades so that the kernels are freed whole and the shells and kernels fall from the operating chamber to a receptacle therefor.

11 Claims, 6 Drawing Figures

Patented May 16, 1972

Paul W. Shaw,
INVENTOR.

BY *J. C. Baisch*

Attorney

Patented May 16, 1972

Paul W. Shaw,
INVENTOR.

BY
Attorney

3,662,799

NUT CRACKING APPARATUS

BACKGROUND OF THE INVENTION

1. Field of the Invention

The invention relates generally to a machine or apparatus for cracking the shells of nuts and relates more particularly to apparatus for mass cracking of nuts without crushing or breaking the meat of the nuts.

Description of the Prior Art

Various types of nut cracking apparatus have been proposed but these operate on the principle of crushing the shells. Such crushing of the shells tends to also crush or break up the kernels of the nuts. The commercial value of broken or crushed nut kernels is greatly reduced, top prices being paid for whole nut kernels.

SUMMARY OF THE INVENTION

The present invention comprises a stationary plate having a sharp cutting blade projecting somewhat from the face of the plate. Next to the plate is a rotatable wheel having a shallow frustum-shaped side facing the plate and adjacent thereto. The diameter of the wheel is approximately twice the height of the plate and the wheel has a plurality of sharp radial blades adapted to cooperate with the blade of the plate in cracking nuts.

The space between the wheel and the plate comprises an operating chamber that narrows toward the bottom. Shells and nut kernels drop into a receptacle after the nuts have been cracked, the blades cooperating to crack and twist the nuts to effectively crack the shells without crushing or breaking the kernels.

A sprocket-like feeder wheel feeds nuts one at a time from a hopper into the operating chamber, at the lower end of which the nuts are cracked.

Since the operating chamber narrows toward the lower end, the apparatus automatically handles, within predetermined limits, nuts of various sizes so that it is not necessary to size or sort the nuts prior to putting them in the hopper of the apparatus.

The invention is, also, very effective in cracking twins and/or odd or irregularly shaped nuts which often clog up grader apparatus. The present apparatus takes care of such nuts without their being previously graded, thereby eliminating the problem.

The characteristics and advantages of the invention are further sufficiently referred to in connection with the following detailed description of the accompanying drawings which represent one embodiment. After considering this example skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only.

DESCRIPTION OF THE PREFERRED EMBODIMENT

Figure 1:
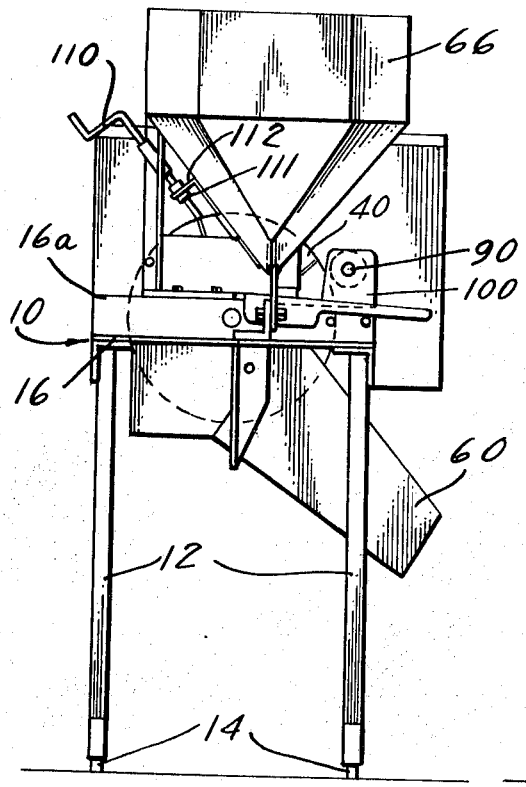
FIG. 1 is a front elevational view of apparatus embodying the invention.
Figure 2:
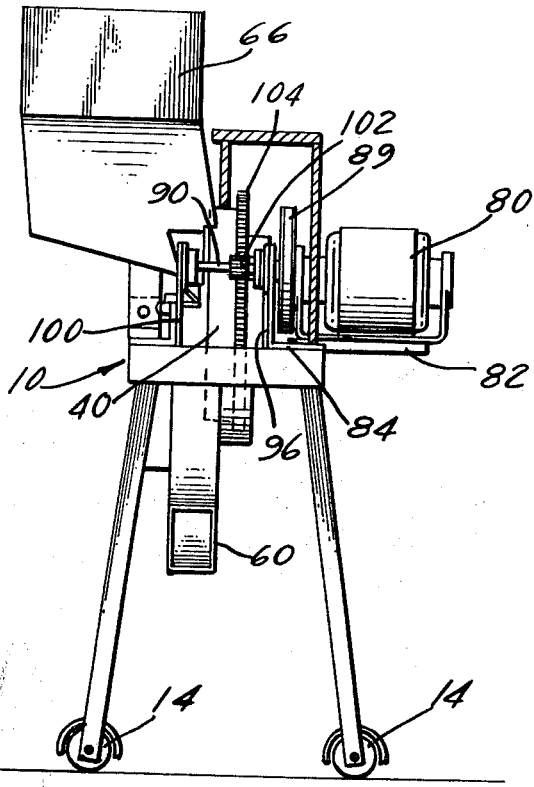
FIG. 2 is a side elevational view with portions of the apparatus broken away to show the interior mechanism.
Figure 3:
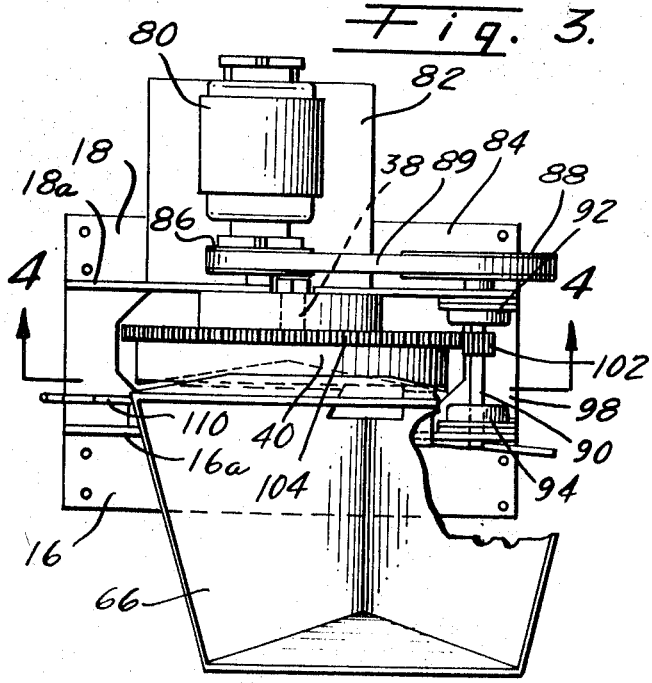
FIG. 3 is an enlarged top plan view.

Referring to the drawings, there is shown apparatus embodying the invention and comprising a stand having a top, indicated generally at 10, and supporting legs 12 which have castors 14.

The top comprises angle irons or members 16 and 18, to which the upper ends of the legs are secured by any suitable means such as, for example, welding or the like. The angle member 16 is at the front and the angle member 18 is at the back, said angle members having the upstanding parts 16a and 18a, respectively at the inner sides in parallel relationship to each other and spaced apart.

Figure 6:
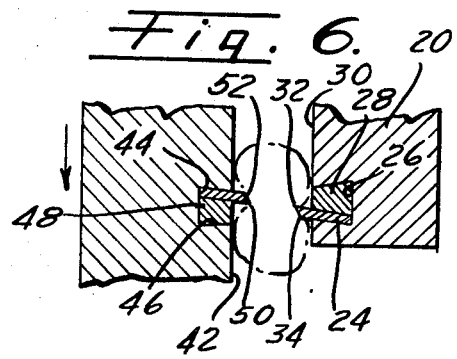
FIG. 6 is an enlarged sectional view taken on line 6—6 of FIG. 5.

A fixed or stationary plate 20, in the space 21 between said angle members, is secured to one of the angle members, said plate being shown as secured to the inner side of the part 16a of the front angle member by means of screws or bolts 22. Other suitable securing means may, of course, be used. Plate 20 has a vertical blade 24 which is disposed in a dovetail vertical groove 26, secured in said groove by means of a wedge-shaped key 28, or by any other suitable means. Blade 24 has a free edge portion that extends beyond the inner face 30 of the plate 20, said free edge portion of the blade being sharp with the sharp edge at the top and the bevel 34 inclined from the sharp edge 32 and toward one side, although, as shown in FIG. 6, it is inclined downwardly toward the face 30 of the plate 20.

There is a horizontal shaft 38 having its ends operably carried by the upstanding parts 16a and 18a of the angle members 16 and 18, respectively. A wheel 40 is rotatably mounted on shaft 38. The diameter of the wheel is approximately twice the height of the plate 20 and the lower part of the wheel is disposed in the space 21 between the angle members 16 and 18, the side 42 of the wheel 40, adjacent the plate, being a shallow cavity or recess in the shape of a shallow frustum, the deepest part of which is adjacent the axis or shaft 38 on which said wheel is adapted to rotate. Within the frustum-shaped cavity are a plurality of sharp radially arranged blades 44. There may be any suitable number of blades. For example, there are eight blades, as shown, equally spaced apart annularly.

These blades 44 are disposed in wedge-shaped or dovetail radially extending grooves 46 in wheel 40 and are secured in said grooves by wedge-shaped keys 48. The blades 44 have their sharp edges 50 opposite the sharp edge 32 of the blade 24 and, when respective blades 44 are opposite the blade 24, the bevel 52 is inclined oppositely of the bevel 34. As related to the direction of rotation of the wheel 40, the sharp edges 50 lead.

The wheel 40 is spaced axially from the plate 20 by the hub 56 of a sprocket-like nut feeding wheel, indicated generally at 58, the wheel 40 being close at its bottom to the plate 20. However, the spacing is such that the blades 44 will not strike the blade 24 when wheel 40 is rotated, but such spacing is sufficient to permit shells and kernels of nuts that are cracked to drop from between the wheel and plate into a chute 60, from which they may be discharged into a suitable receptacle, not shown.

Because of the frustum shape of the cavity 42, the space, which is termed herein the cracking chamber 64, between the plate 20 and wheel 40 tapers or narrows downwardly, so as to accommodate nuts of various sizes within predetermined limits.

Nut feeding wheel 58 is secured by a key or the like, not shown, the inner end of the hub 56 being between the inner ends of the blades 44.

Figure 4:
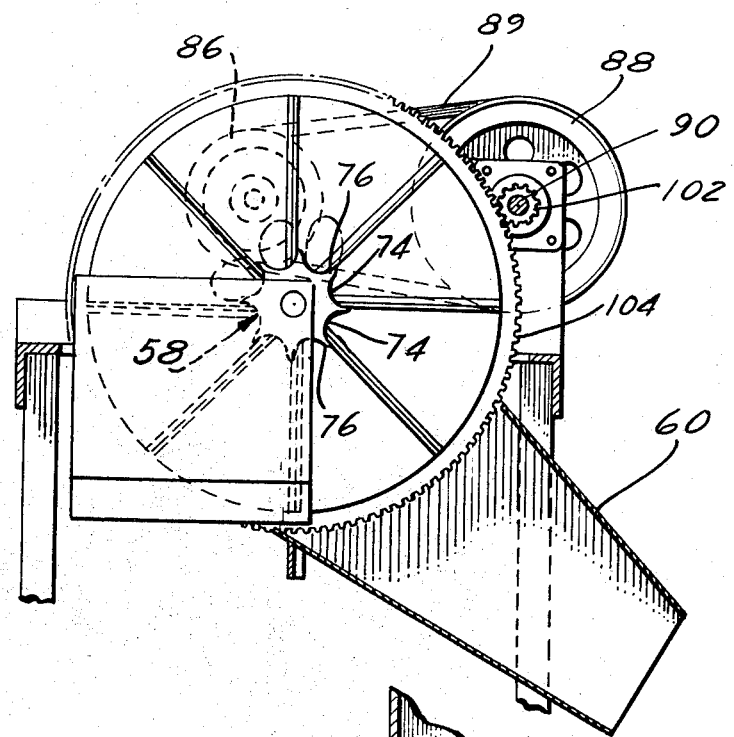
FIG. 4 is an enlarged sectional view taken on line 4—4 of FIG. 3.
Figure 5:
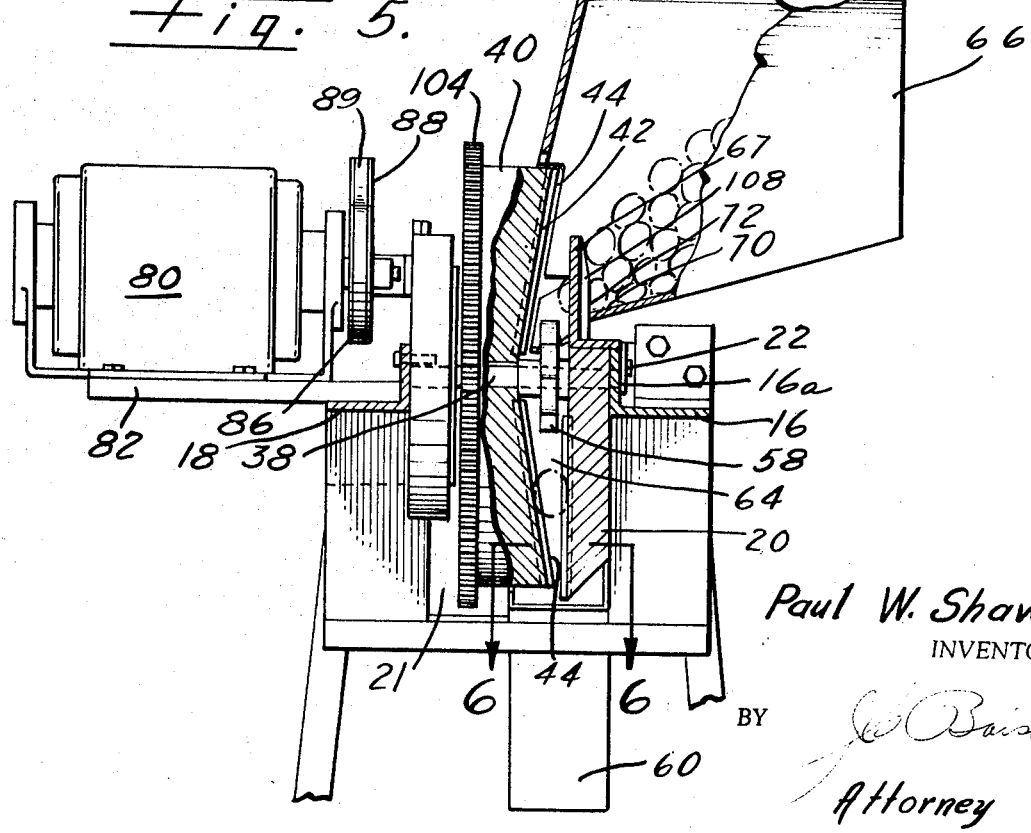
FIG. 5 is an enlarged side elevational view with portions broken away showing interior construction.

There is a hopper 66 secured to the upstanding arm 67 of an angle member 68 secured to the the top of the plate 22 by bolts or the like, not shown. The bottom 70 of the hopper is inclined downwardly toward the nut feeding wheel or sprocket 58 and there is an opening 72 at the lower end of the hopper through which nuts pass to be received in the respective spaces or pockets 74 defined by adjacent teeth 76 of the nut feeding wheel, as best shown in FIG. 4. There is one space of pocket 74 for each space between adjacent blades. Nuts entering the spaces 74 are carried by the feeding wheel 58 to a point where they drop from the spaces 74 to the bottom of the chamber 64. The nuts will drop as far down in cracking chamber 64 as the narrowing of the chamber will permit.

The blades project from the plate and wheel, respectively, approximately one-eighth of an inch from the faces of said plate and wheel 40, although they may extend any other suitable amount therefrom. The one-eighth inch has been found to be very satisfactory.

It is to be noted that there is a space 74 for the respective spaces between adjacent blades 44 of the wheel. Since there are eight blades 44, there are eight spaces 74. Thus, the nuts are fed into the cracking chamber between adjacent blades 44, one nut into the space between adjacent blades 44.

The wheel is rotated at a relatively slow speed, approximately 72 times per minute, although it may be rotated at any other suitable speed. As the wheel rotates, the nuts are engaged, successively, by the fixed blade 24 and the oncoming blade 44, as shown in FIG. 6, the sharp edges 32 and 50 acting on the nuts with both a cutting and a twisting action which cracks the nuts and frees the kernels, practically all of the kernels being freed whole from the shells. Both the shells and the kernels drop from the cracking chamber 64 between the peripheral part of the wheel at the bottom and the adjacent face of the plate 20.

Means for rotating wheel 40 is provided and comprises a source of power, such as electric motor 80, although any other suitable source of power may be used such as a small internal combustion engine, for example. Motor 80 has a base 82 which is secured to the horizontal part 84 of the rear angle member 18 by screws or the like, not shown.

A pulley 86 is secured to the drive shaft of the motor 80 and operably connects the motor 80 to a pulley 88 by means of a belt 89 mounted on a shaft 90 having end portions operably mounted in bearings 92 and 94, respectively, bearing 92 being carried by a bracket 96 secured to a top member 98 of the top 10 of the stand while bearing 94 is carried by a bracket 100 attached to the top member 98. These brackets are secured to the top member 98 by any suitable means such as, for example, screws, not shown.

Shaft 90 has a pinion 102 secured thereon which meshes with a large gear 104 on the periphery of the wheel 40. Since the pinion is much smaller than the gear 104 of the wheel, there is the desired speed reduction between the speed of the motor and wheel 40 so that wheel 40 rotates at the desired slow speed. This, also, provides sufficient power to crack the hard shells of macadamia nuts.

While the apparatus will automatically accommodate various sizes of nuts, particularly the sizes encountered in any particular type, it may be desirable to adjustably vary the size of the outlet opening of the hopper for different types of nuts. For example, it has been found that the apparatus will satisfactorily handle walnuts, pecans and other nuts, as well as macadamia nuts, and it has been found advantageous to set the size of the hopper outlet according to the type of nuts to be cracked.

Means for adjusting the size of the hopper outlet comprises a slide 108 which is shifted or adjusted horizontally by means of a crank 110. A threaded part of the crank works in a screw 111, operably carried by a bracket 112 secured to the hopper. Turning of the crank effects adjustment of the slide to vary the size of the hopper outlet. Once the adjustment is made for a particular type of nut, the apparatus will automatically accommodate the various sizes of nuts of that type.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. Nut cracking apparatus, comprising:
   A. a pair of sharp edged blades facing each other in spaced relationship less than the size of nuts to be cracked;
   B. means for feeding nuts to be cracked to said blades;
   C. means for effecting relative movement of said blades for cracking said nuts by cutting and twisting same;
   D. there being a fixed plate with one of said blades secured to said plate at one side thereof, with the sharp edge thereof extending from the face of said plate, said blade being a fixed blade; a wheel rotatably mounted adjacent the side of the plate having the fixed blade, the other of said blades being secured to said wheel at the side adjacent the plate, said blade being radially arranged relative to the wheel and coming into parallel relationship with the fixed blade upon rotation of said wheel;
   E. and wherein the wheel is mounted on a substantially horizontal shaft, the side of the wheel adjacent the plate being recessed and having a plurality of radially extending blades cooperable with the fixed blade for cracking nuts by cutting and twisting engagement therewith by said blades.

2. The invention defined by claim 1, wherein the facing sides of the plate and wheel define a nut receiving chamber wherein nuts to be cracked are supplied for positioning between the fixed blade and respective blades on the wheel.

3. The invention defined by claim 2, wherein the operating chamber tapers downwardly, the lower part of the wheel being spaced from the plate sufficiently to permit shells and kernels of cracked nuts to drop from said chamber.

4. The invention defined by claim 3, including a hopper with an outlet for supplying nuts to be cracked to the chamber.

5. The invention defined by claim 4, including means for individually feeding nuts into said chamber.

6. The invention defined by claim 5, wherein said means for individually feeding nuts into said chamber comprises a sprocket having pockets for individual reception of nuts from the hopper, there being a pocket for each space between blades on the wheel carrying said blades, said sprocket rotating in fixed relationship to said wheel.

7. The invention defined by claim 6, wherein the means for effecting relative movement of the blades comprises means for rotating said wheel.

8. The invention defined by claim 4, including means for adjusting the size of the outlet of the hopper.

9. Nut cracking apparatus, comprising:
   A. a support;
   B. a fixed plate attached to said support;
   C. an elongated blade having a relatively sharp edge portion, said blade being substantially vertical and secured to said plate with the sharp edge portion projecting somewhat from the adjacent face of the plate;
   D. a wheel rotatably mounted to said support, said wheel having a cavity in one face positioned adjacent the plate, the diameter of the wheel being substantially greater than the length of the blade of said plate;
   E. a plurality of radially extending blades carried by said wheel at the cavity side thereof, said blades having a sharp edge portion which extends from the face of the wheel adjacent to the plate;
   F. the wall of the wheel defining the cavity flares from the axial central portion of the wheel and the lower part of the cavity defines with the adjacent face of the plate an operating chamber which narrows toward the lower end, the periphery of the wheel being spaced from the lower end of the plate to provide space for cracked shells and nut kernels to drop out of the chamber;
   G. the blade of the plate and the blades of the wheel being spaced apart but cooperating in engaging nuts in the chamber to cut and twist said nuts, cracking the shells and removing the kernels thereof;
   H. means for feeding nuts into said chamber;
   I. and means for rotating said wheel.

10. In nut cracking apparatus, comprising:
    A. a fixed blade support means;
    B. a relatively sharp edged blade fixedly secured to one side of the fixed blade support means;

C. a rotatable wheel like blade support means adjacent the side of the fixed blade support means having the fixed blade;

D. a relatively sharp edged blade radially secured to the wheel, said blade being rotatable into nut cracking relationship with the fixed blade whereat the blades are convergent and are closer together at their ends adjacent the periphery of the rotatable blade support means, the nuts being fed between the fixed and rotatable blade support means for engagement by the blades for cracking said nuts by cutting and twisting same.

11. The invention defined by claim 10, wherein the side of one of the blade support means to which its blade is secured is substantially flat while the adjacent side of the other blade support means is concave with its blade secured at said adjacent side; and one of the blade support means is rotatable.

* * * * *